Patented Feb. 14, 1928.

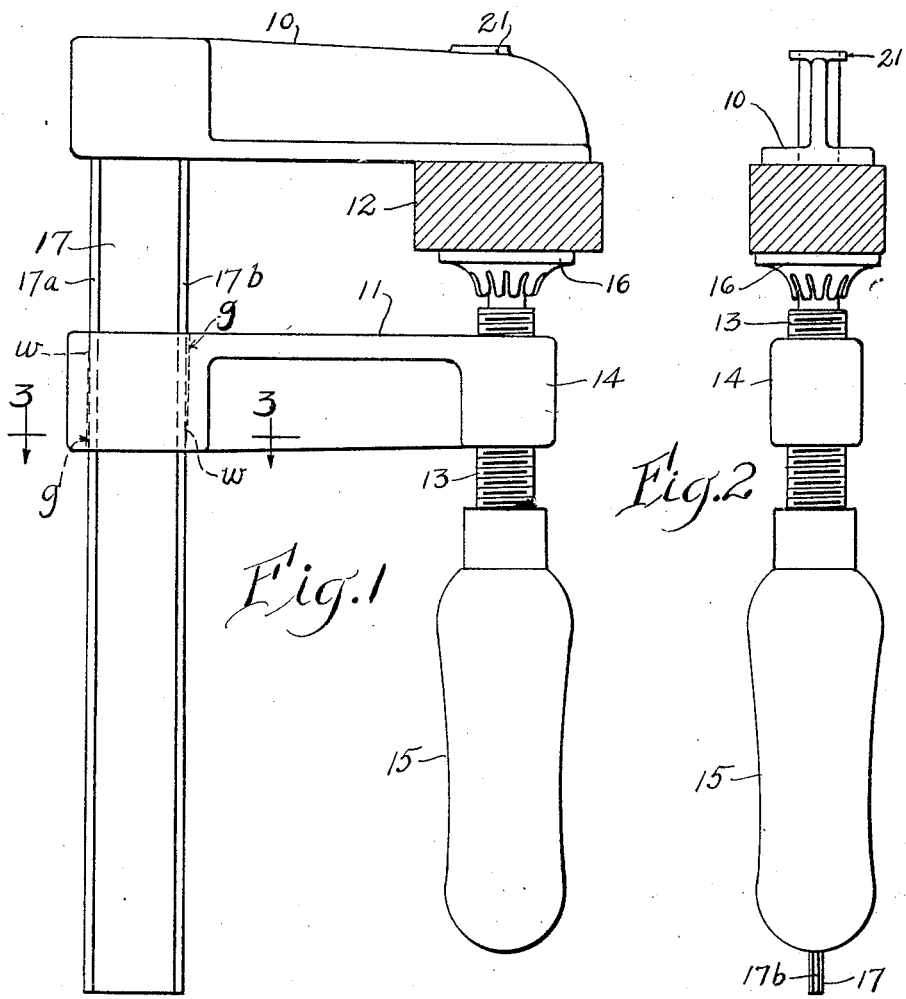

1,659,342

UNITED STATES PATENT OFFICE.

MAX WETZLER, OF BROOKLYN, NEW YORK.

CLAMP.

Application filed March 14, 1927. Serial No. 175,288.

This invention relates to clamping tools and machinery and has particular reference to devices of that general nature that are constructed to be portable.

Among the objects of this invention is to provide a clamp or holding tool that is of a highly simplified construction, and one that can be operated with the maximum ease and rapidity.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof, reference is had to the accompanying drawings, in which like reference characters designate the same parts in the several views, and in which—

Figure 1 is a side elevation of the clamp.
Figure 2 is an edge view of the same.
Figure 3 is an enlarged sectional view on line 3—3 of Figure 1.

Referring now more specifically to the drawings, the invention is shown as comprising a plurality of relatively movable jaws 10 and 11 which are arranged to hold a block of wood or other article 12 in any suitable manner.

Cooperating with said jaws is provided a power actuating member, whereby the pressure or grip on said block can be regulated or increased to any desired degree. As a simplified arrangement thereof, a screw 13 is shown threaded through a hub 14 formed in jaw 11. Said screw is operated in any suitable manner as by a handle 15. Antifriction means in the form of a bearing cap 16 is mounted in a conventional manner on the free end of the screw and in rotatable relation thereto about the axis of the screw. Block 12 is thus retained securely between jaw 10 and said bearing cap.

Means is provided whereby the jaws 10 and 11 can be set easily and with rapidity at any desired or arbitrary distance apart according to the size of the block to be gripped. More specifically, tension means is provided arranged to hold the jaws at any desired distance apart through frictional engagement. Thus a shank 17 is positioned transversely to the jaws, and is secured to jaw 10 fixedly, or otherwise, and jaw 11 is movable with respect to said shank. The latter jaw may be constructed with sleeve 18 or the like, which is formed with a hole or opening 19 to slidably receive said shank. To increase the frictional engagement between the shank and the movable jaw, wedge engagement is provided therebetween. Thus the shank, which may be of rectangular cross section, is formed with wedges 17$^a$ and 17$^b$ extending lengthwise thereof along the edges of the shank or bar. The opening 19 is formed with corresponding grooves 19$^a$ and 19$^b$ to receive said wedges. To insure of easy movement of jaw 11 along said shank, the opening 19 is preferably somewhat larger than the shank. When force is brought to bear upon the screw to grip an article, jaw 11 will move slightly angularly to the shank causing the grooves and wedges to snugly contact and form a tight grip between the shank and the jaw 11 to prevent unintended movement of the jaw. The inner edges of the grooves will then have assumed substantially the position shown by dotted lines $g$ in Fig. 1. To insure of a proper functioning of the grooves and wedges, the grooves are preferably made somewhat deeper than the wedges to provide reserve spaces 20 into which the metal of the corresponding wedges may flow. When the clamp is in released position, jaw 11 will be inclined slightly at an angle to the shank or tension bar, and with the free end of said jaw toward the fixed jaw 10. The jaw 11 will then be substantially at right angles to said shank when the clamp is in operative position, gripping an article. The points where the wedging action occurs when the clamp is used are indicated by letters W. The jaw 11 tends to rotate about the shank, like a cantilever beam. When it is desired to grip a block or the like, jaw 11 is moved toward the fixed jaw until the bearing cap contacts the article. A turn of the handle 15 then suffices to hold the article tightly. To remove the article, the handle is turned slightly in reverse direction, and the movable jaw moved away. This device is very simple to manufacture, and can be used with ease and rapidity. It is also compact, and the screw can be of a minimum length. At the top of the fixed jaw, lugs 21 are provided extending on each side of said jaw to facilitate the manipulation of the clamp.

I claim:

A clamp including a pair of jaws, a flat bar with smooth plane sides connecting said jaws, and a screw mounted on one of said jaws to exert pressure to grip an article between the jaws, one of said jaws being slidable along the bar, the bar having a pair of opposite, longitudinal blunt ended wedges, the slidable jaw having an opening to receive and frictionally engage the bar, said opening having longitudinal grooves to snugly receive the wedges, said grooves having acute angle apices providing reserve spaces beyond the end wedges to permit of an even flow of metal thereinto on deformation of the bar so that the slidable jaw is easily movable, the grooves and wedges being frictionally engageable on exerting pressure on an article with said screw.

Signed at Brooklyn in the county of Kings and State of New York this 6th day of December A. D. 1926.

MAX WETZLER.